United States Patent [19]

Amano et al.

[11] Patent Number: 4,669,964
[45] Date of Patent: Jun. 2, 1987

[54] TIRE VULCANIZER

[75] Inventors: Itaru Amano, Kobe; Yasuhiko Fujieda; Katsumi Ichikawa, both of Akashi; Masahide Kanzawa, Kobe; Toshio Yanagihara, Kobe; Shikao Misumi, Kobe, all of Japan

[73] Assignee: Kabushiki Kaisha Kobe Seiko Sho, Kobe, Japan

[21] Appl. No.: 837,168

[22] Filed: Mar. 7, 1986

[30] Foreign Application Priority Data

Mar. 11, 1985 [JP] Japan .............................. 60-34991[U]
Mar. 26, 1985 [JP] Japan .............................. 60-44192[U]
Apr. 5, 1985 [JP] Japan .............................. 60-51512[U]
May 2, 1985 [JP] Japan .................................. 60-95121
Jan. 27, 1986 [JP] Japan .............................. 61-10487[U]

[51] Int. Cl.⁴ ....................... B29D 30/04; B29C 33/00
[52] U.S. Cl. .................................... 425/34 R; 425/35; 425/52
[58] Field of Search ....................... 425/17, 19, 23, 25, 425/27, 28 R, 34 R, 35, 51, 52, 450.1, 451, 451.3, 451.9, 454, 441, 18, 38, 43, 47

[56] References Cited

U.S. PATENT DOCUMENTS 1,812,792  6/1931  Kilborn .............................. 425/34 R
2,343,881  3/1944  Brundage ........................... 425/34 R
3,816,217  6/1974  Barefoot ................................ 425/17

Primary Examiner—Willard E. Hoag
Attorney, Agent, or Firm—Oblon, Fisher, Spivak, McClelland & Maier

[57] ABSTRACT

A tire vulcanizer which includes a lower mold assembly secured to a press base, an upper mold assembly held movably up and down on a press side frame and provided to be opened and closed with respect to the lower mold assembly, a molding bladder expansible with respect to a center mechanism of the lower mold assembly and pressurized heating medium supplying means, wherein for maintaining a parallelism of the upper and lower mold assemblies, a torsion shaft for maintaining the parallelism which is movable up and down and rotatable about an axis in synchronism with the upper mold assembly is mounted at a position parallel to the press base, at a right angle to the side frame and not interfering with the upper and lower mold assemblies.

1 Claim, 19 Drawing Figures

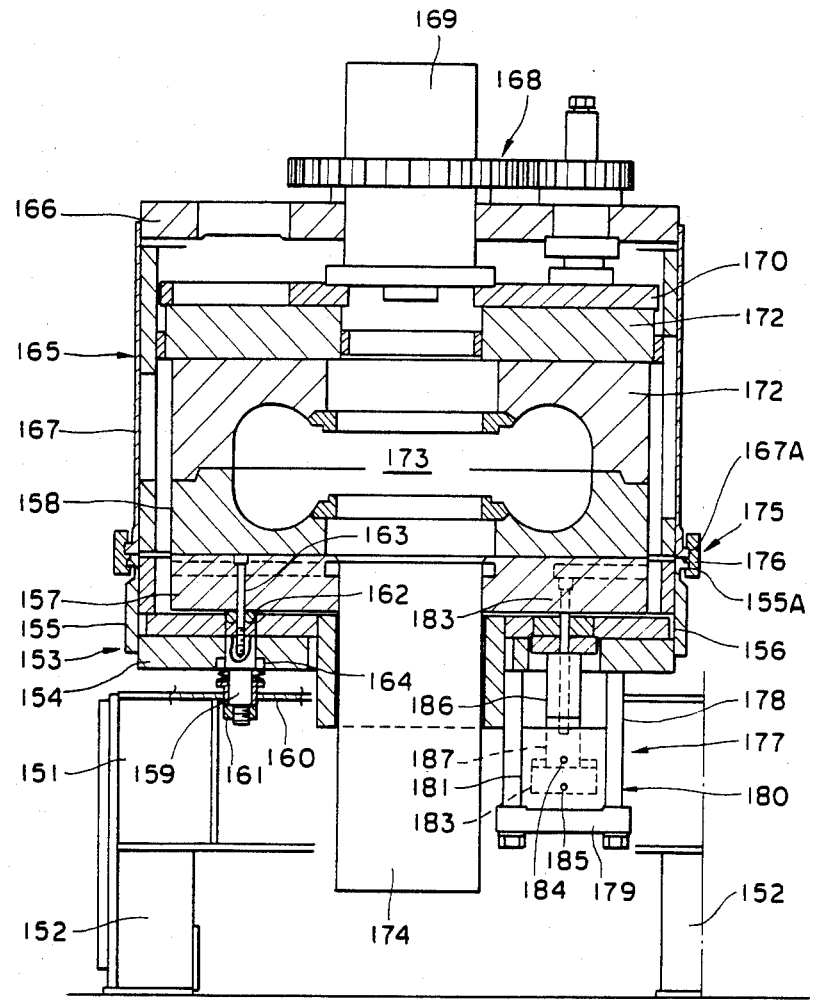

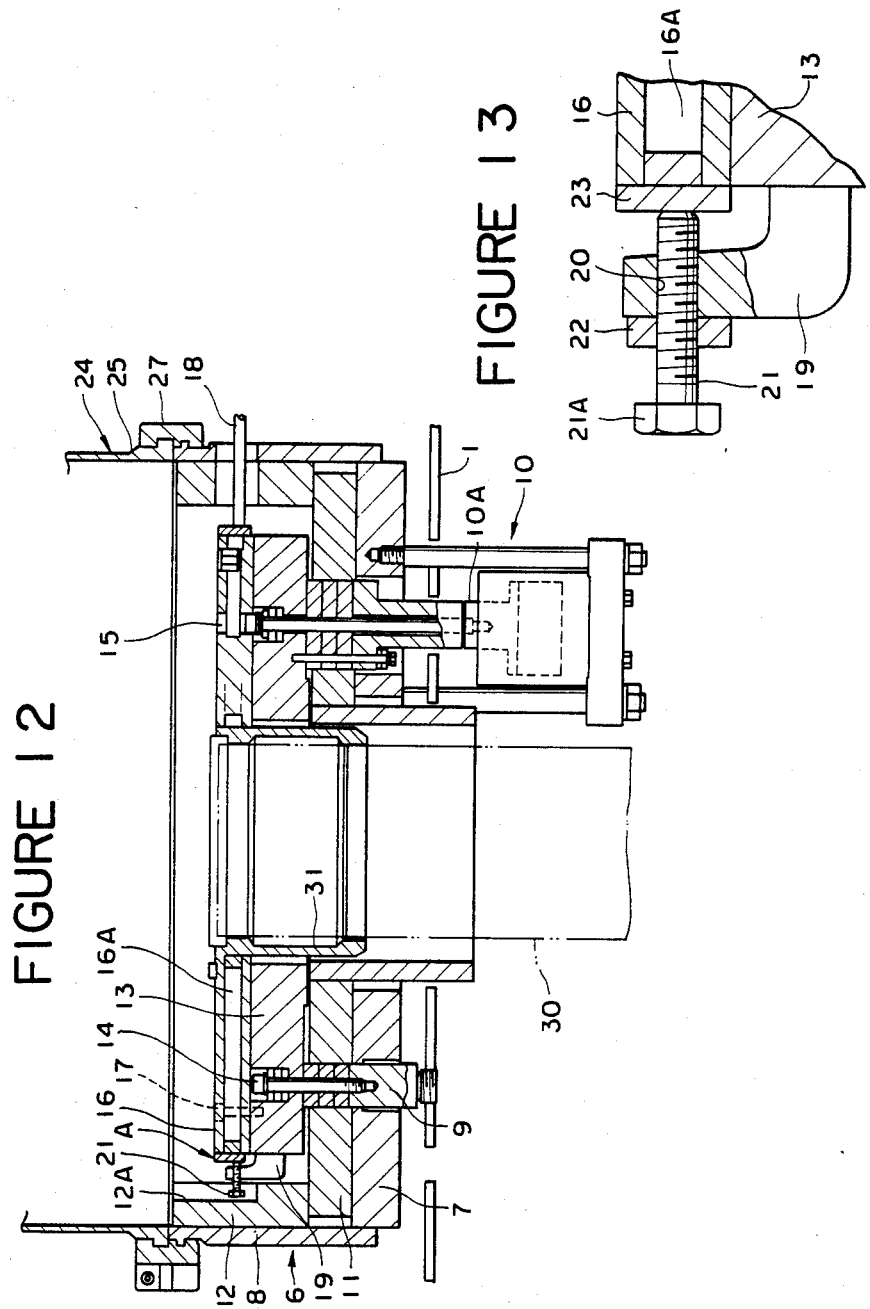

TIRE VULCANIZER

BACKGROUND OF THE INVENTION

1. Field of the Invention

The present invention primarily relates to (1) a tire vulcanizer in which green tires are sealed into upper and lower molds, respectively, in upper and lower mold assemblies, and vulcanization and molding of the tires are affected through attachment of a molding bladder to the inner surface of the tire, a supply of pressurized heating medium into the bladder and heating of the upper and lower molds, and particularly to the maintenance of parallelism in the upper and lower mold assemblies at a high degree; The present invention further relates (2) an improvement in the device in which adjustment of an upper mold with respect to a lower mold in a tire press is effected by synchronous rotation between the center gear positioned in the center and a plurality of nut gears disposed so as to encircle the center gear, whereby the synchronous motion is made accurately to precisely and stably obtain the adjustment of the height of the upper mold; The present invention still further relates (3) a mold fastening device in a tire vulcanizer; The present invention relates to (4) a platen type tire vulcanizer for tires used for trucks, buses and passenger vehicles, and more specifically to a tire vulcanizer capable of centering and adjusting a lower platen having a heating source with respect to an upper platen; The present invention finally relates (5) an improvement in a carrying-out device for taking an already vulcanized tire used in a tire vulcanizer out of a vulcanizing mold, the device including means for holding the tire safely without possible disengagement.

DESCRIPTION OF THE PRIOR ART

There is known, without specific illustration of well known inventions or the like, a tire vulcanizer comprising a lower mold assembly secured onto a press base, an upper mold assembly held movably up and down on a press side frame and provided to be opened and closed with respect to the lower mold assembly, a molding bladder expansible relative to a lower mold center mechanism, and a pressurized heating medium supplying means. This tire vulcanizer will be briefly described with reference to FIGS. 1, 2 and 3 showing the tire vulcanizer as an embodiment in accordance with the present invention. While a tire vulcanizer shown in FIGS. 1, 2 and 3 is one of twin types in which vulcanizing and molding molds in two sets of upper and lower mold assemblies are juxtaposed within a common press frame, it will be noted that a single type employing a set of vulcanizing and molding molds or a multi-type employing more than two sets, for example, four sets of such molds is similar is basic construction to the twin type. The frame of the vulcanizer is constructed by erecting side frames 4, 4 on both sides of a base 9 horizontally provided on a floor 9, and connecting upper ends of both the side frames 4, 4 to each other by means of a top beam 10. A lower mold assembly 11 is fixedly mounted on the base 9, the lower mold assembly 11 comprising a lower dome (which is sometimes omitted), a lower platen having an insulator, a hot plate or the like, a lower mold mounted on the lower platen, etc. not shown. An expansible bladder for utilizing the base 9 to effect molding of the inner surface of a tire including shaping and a center mechanism comprising means for supplying a pressurized heating medium such as steam into the bladder is disposed at the center (press center) position of the lower mold assembly 11. FIG. 3 shows a part of a center mechanism 12 which has been moved upward by a knock-out lever 13 provided on the side of the base 9, a driving cylinder 14 provided on the side frame 4 and the like. Similarly to the lower mold assembly 11, an upper mold assembly 15 comprises an upper dome (which is sometimes omitted), an upper platen comprising an insulator, a heat plate or the like, an upper mold mounted below the upper platen and the like. Generally, a center mechanism comprising a height adjusting mechanism which varies the height of the upper mold is provided movably up and down at a center (press center) position of the upper mold assembly 15. In opening and closing the upper mold assembly 15 with respect to the lower mold assembly 11 by the vertical movement thereof, a slide 16 is provided on the side toward the side frame 4 of a frame 6 (which sometimes comprises an upper dome) for supporting the entire upper mold assembly 15, guide rollers 17, 18 are in rolling contact with a guide rail provided on the side of the side frame 4 to prevent an inclination in all directions, which in the illustrated embodiment is held on a piston rod 72 of a fluid pressure cylinder 7 installed on the side of the side frame 4, whereby the frame 16 is moved up and down through the slide 16 by forward and backward movement of the piston rod 7a to open and close the upper mold assembly 15 with respect to the lower mold assembly 11. Thus, the upper mold assembly 15 is released with respect to the lower mold assembly 11 and displaced upwardly. A green tire is carried onto the lower mold of the lower mold assembly 11 by a tire loader 19 or the like disposed on one side of the vulcanizer as shown in FIG. 1. A molding bladder is attached to the inner surface of the green tire while the pressurized heating medium is supplied to effect shaping. The upper mold assembly 15 is moved down to close the upper mold with respect to the lower mold, and both the assemblies 11, 15 are clamped by means of clamping rings 20 or the like shown in FIG. 2. Then, clamping of both molds, pressurizing, heating of molds and required vulcanizing and molding while being supplied with pressurized heating medium are carried out. After completion of vulcanizing and molding, the upper mold assembly 15 is released and displaced, and an already vulcanized tire is removed from the lower mold and the molding bladder is taken out. At the same time, the already vulcanized tire is received by a tire unloader 21 as shown in FIG. 3 and then carried out. Needless to say, the above-described procedures are conventional. Although there are various changes in design and construction, the vertically opening and closing type tire vulcanizer has the basic construction and function as described above.

The above-described vertically opening and closing type tire vulcanizer has the merit in advantageously in securing parallelism of the upper and lower molds. However, recent demands for the parallelism in such a tire vulcanizer has been very severe, and for example, in terms of numerical value, a severe value, within 0.2 mm/m, is required. A conventional system involves a problem to cope with the severe demand as described. The motion mechanism for vertical upward and backward movement shown in FIGS. 1 to 3 is the fluid pressure cylinder 7. For other motion mechanisms, there are means in which, a screw shaft is reversibly rotatably mounted by bearings on the side of the side frame 4, and a ball screw nut is provided on the side of the slide 16, the ball screw nut being threadedly engaged with the screw shaft to effect vertical upward and downward movement. In use of either motion mechanism, the means for maintaining the parallelism is merely designed so that a slide guide member such as a guide rail 17 is provided on the side of the side frame 4 and a plurality of guide rollers 18, 19 disposed on the side of the slide 16 are placed in contact with the slide guide member with the position and direction being different from each other. The recent severe demand for parallelism is difficult to be satisfied by such a slide guide construction as described above. According to the feature of the tire vulcanizer, it is necessary to carry out the operation in which in a halfway position of closing upper and lower mold assemblies 15, 11, green tires expanded by pressurized heating medium (steam) from the inside are compressed and the tires are sealed and set into the upper and lower molds. To maintain a high quality of the tire, particularly uniformity and homogeneity of the tire, it is important to properly maintain the parallelism of the upper and lower molds. In the twin type wherein two units of mold assemblies are juxtaposed for a single vulcanizer, as shown in FIGS. 1 to 3, employing the slide guide system by the frame 6 and slide 16 in which the fluid pressure cylinders 7 are provided on the left and right side frames 4, 4, respectively, when both the fluid pressure cylinders 7, 7 are different in thrust (10% or so will be sufficient in view of experiences), or when only one unit on one side is used for vulcanization, there exists a resistance from the green tire side and the slide guide side receives an uneven force, thus making it difficult to obtain parallelism. In order to satisfy with the severe values less than 0.2 mm/m as previously noted, it is necessary to realize a very severe design specification by which the parallelism in the left and right slide guides is observed to be within 0.05 mm. To this end, the slide guide construction having an extremely great rigidity and or a length is required, which gives rise to a difficulty in terms of a space as well as installation, and in addition, restriction of control of the stroke in the fluid pressure cylinder is also required.

In a conventional mold-height adjusting device, in a tire press wherein a lower mold assembly is installed on a press base, an upper mold assembly is held on the side of a press frame so that the upper mold assembly may be opened and closed with respect to the lower mold assembly, and green tires are sealed into upper and lower molds of both assemblies and a molding bladder in a center mechanism of the lower mold assembly is attached to the inner surface of the tire while a pressurized heating medium is supplied, thus effecting vulcanizing and molding through heating of the upper and lower molds, it being necessary that the spacing between the upper and lower molds be made variable according to the size of tires. In prior art, the upper mold in the upper mold assembly is moved up and down to change the height of the upper mold, as schematically shown in FIGS. 8 and 9. FIG. 8 shows the entire body of the upper and lower mold assemblies in the tire press. A lower mold assembly 101 is secured to a base frame 102 in a press machine whereas an upper mold assembly 103 is installed on a side frame 104 in the press machine so that the assembly 103 may be moved up and down from a closed position as indicated by solid lines to an open position as indicated by the chain lines, the upper mold assembly capable of being opened and closed with respect to the lower mold assembly 101. Means for securing the lower mold assembly 101 and means for moving the upper mold assembly 103 upward and downward are well known and therefore will not be further mentioned. The lower mold assembly 101 consists, as is known, of a lower dome 105, a lower platen 106 comprising a hot plate, an insulator or the like, a molding bladder for the inner surface of a tire, a center mechanism 107 comprising means for supplying a pressurized heating medium such as steam, an expanding mechanism for the bladder, and a lower mold 108 secured onto the lower platen 106 and the like. The upper mold assembly 103 also consists, as is known, of an upper dome 109 held movably up and down on the side of the side frame 104, a center mechanism 111 slidably inserted into a guide support 110 provided at a press center position of the upper dome 109, an upper platen 112 comprising a hot plate held on the center mechanism 111, an insulator or the like, an upper mold 113 secured to the upper platen 112 and the like. In an adjusting device which adjusts the height of the upper mold 113 to meet the size of the green tire, a ring-like center gear 115 is rotatably mounted on the guide support 110 through a bush or the like at the top 114 of the upper dome 109, four (in the illustrated example) screw nuts 116 are peripherally equidistantly provided on the top 114 of the upper dome 109 encircling the center gear 115, the top 114 is holdingly and rotatably disposed through a gear support 140 and a flange 139 provided on both upper and lower ends of the nut 116, and a nut gear 117 provided on the gear support 140 of each screw nut 116 is meshed with the center gear 115. Each screw shaft 118 threadedly inserted into each of said screw nuts 116 is connected to the upper platen 112. Thus, according to the above-described construction, as the center gear 115 rotates, each nut gear 117 is synchronously rotated, and the screw nut 116 integral with the nut gear 117 rotates at its position, whereby each screw shaft 118 is moved up and down through the normal and reverse rotation of the center gear 115 along with the upper platen 112 to freely vary and adjust the position of the upper mold 113 secured to the upper platen 112. In the prior art devices, in the normal and reverse rotation of the center gear 115, a power pinion 120 of a prime mover 119 such as a motor mounted on the top 114 of the upper dome 103 is brought into engagement with a reduction intermediate gear 121 mounted on the top 114 to bring the intermediate gear 121 into engagement with a driving pinion 122 likewise mounted on the top 114 and meshed with the center gear 115 to thereby rotate the center gear 115, or the driving pinion 122 is brought into engagement with one of four nut gears 117 whereby the center gear 115 is rotated by the nut gear 117.

The prior art has is characterized by the following problems. An area of the upper dome 110 in the upper mold assembly 103 is restricted and the center mechanism 111 is present with a considerable diameter. Therefore, the remaining available area is further decreased, and a plurality of bolt mounting portions 123 for the molds as shown in FIG. 9 have to be provided in addition to installation of a plurality of screw nuts 116 and nut gears 117. Therefore, the direct engagement of the driving gear 122 shown in FIG. 9 with the center gear 115 to rotate the center gear 115 is advantageously in synchronous rotation of the nut gear 117 but the provision of the driving pinion 122 and intermediate gear 121 in the space remaining by the installation of the nut gear 117 and bolt mounting portions 123 involves a very rigid design. In addition, the prime mover has to be installed and therefore, restriction and unreasonableness in terms of a space occur as well as a disadvantage in that the size of the driving pinion 122 is restricted. Moreover, the engagement of the driving pinion 122 with the single nut gear 117 to rotate the center gear 115 through the nut gear 117 will not cause the unreasonableness in terms of a space but complete synchronous motion of each nut gear 117 is difficult to attain under the influence of backlash of the gear and for other reasons. This is disadvantageous in terms of accurate upward and downward movement of the upper mold.

The present applicant has previously proposed a mold fastening device for a tire vulcanizer in Japanese Patent Application Laid-Open No. 138432/84.

More specifically, in a tire vulcanizer comprising a press base, a lower mold hollow portion and an upper mold hollow portion vertically movable toward the first-mentioned hollow portion, which are arranged opposedly of said base, a center mechanism arranged in each center of the upper and lower mold hollow portions, mechanical locking means for the upper and lower hollow portions, and mold pressing means for directly acting on the lower portion of the lower mold, a mold fastening device for the tire vulcanizer comprising means for securing the lower mold within the lower mold hollow portion to the press base, means for resiliently supporting said lower mold hollow portion on the press base and mold pressing means interposed between said lower mold hollow portion and the lower mold. This proposal is considered to be useful in its own way.

In the above-mentioned prior art, the lower mold hollow portion or cavity is resiliently supported on the press base by means of flat springs or the like and therefore there is a problem in terms of durability. Furthermore, the stop position of the whole press varies so as to make it difficult to set the fastening force and the height of the mold. Moreover, a position at which the press is totally closed is normally set by a limit switch or the like but the flat spring overrunning said position is flexed to make it impossible to substantially detect that amount.

There is known a tire vulcanizer in which an outer circumferential surface of a green tire is molded by an openable and closeable mold device, and an inner circumferential surface of the green tire is molded through a bladder that may be inserted into the mold device.

A tire vulcanizer of the type; in which a tire is once placed on the upper mold in the mold device and thereafter the mold device is totally closed; is known as disclosed in U.S. Pat. No. 4,444,715. In the above-mentioned conventional tire vulcanizer, the centrality of upper and lower platens requires not only repeatability but precision. Despite this requirement, the prior art vulcanizer is not provided with means for adjustment of the centrality of the upper and lower platens, that is, the centering of the lower mold to the upper mold, and therefore, a deviation in the mold device sometimes occurs.

The centering of the mold device must be adjusted when a trial operation is made and due to the presence of a change in a passage of time in addition to the aforementioned reasons. In the prior art, such an adjustment could not be attained by simple means.

There is known, without illustration, a tire vulcanizer (a tire press) in which a preformed green tire is vulcanized and pressed to mold it. It is general in the vulcanizer of the type as described that a fixed lower mold and an upper mold which is openable and closeable with respect to the lower mold are respectively provided with a heating source and disposed opposite each other, a molding bladder is expansibly deformed and attached to the inner surface of the tire is provided in the center of the lower mold through a bladder well or the like together with means for supplying a pressurized heating medium such as steam, the molding bladder being attached to and pressed against the inner surface of the green tire carried into and set to the lower mold to effect shaping as well as closing the upper mold and clamping, whereby heating of the molds and vulcanizing and molding under the supply of the medium are carried out. The already vulcanized tire subjected to vulcanization in the tire vulcanizer of the type as described is raised from the surface of the lower mold, after the upper mold has been opened, or disengaged in a push-up fashion, and carried out of the press machine from the top of the lower mold by means of a tire carrying-out device which is a so-called tire unloader for the succeeding step. The aforesaid tire carrying-out device is needless to say known. In such a carrying-out device, normally, a support member such as an arm for supporting a bottom of the vulcanized tire by turning or linearly moving motion from the outside of the press machine is moved in and out of the center of the press to support the bottom of the vulcanized tire in a horizontal attitude and raised upwardly or forced upwardly of the lower mold to carry it outside of the machine. The carrying-out device is provided with a stopper to prevent the vulcanized tire supported on the support member from being disengaged. The conventional stopper construction includes a system in which the side wall surfaces of the tire are held from the top when the tire is removed from the bladder, or a system in which the side wall surfaces of the tire are held from both the top and bottom, which systems are used widely. In addition to these systems, there is a system in which the removed tire is located by the centering means.

The conventional stopper constructions are complicated mechanisms and have a problem in that the side wall surfaces of the tire are directly held. More specifically, since the height of the tire is varied according to the tire size, adjusting means which are expansible with respect to a member to be held are required. Further, there is a possibility of producing scratches in the side wall surfaces of the tire which is not sufficiently hardened immediately after vulcanization has been made. In many cases, a main object of the carrying-out device of the type as described is to carry out an article from the inside to the outside of the press machine. In transfer of the article from the outside of the press machine to the next station, a tire on the device is gripped by a separate gripping means to move it to a conveying means such as a conveyor. Therefore, the presence of the stopper construction on the upper surface or lower surface of the side wall surface of the tire comprises an obstacle when the tire is gripped by the tire gripping means.

SUMMARY OF THE INVENTION

In accordance with a first invention of the present application, for solving the aforesaid problems, the conventional construction and type are employed, without requiring a basic modification of the slide guide construction, and a new construction is added thereto to thereby positively and easily obtain the maintenance of high parallelism. More specifically, in accordance with the first invention there is provided a tire vulcanizer comprising a lower mold assembly secured to a press base, an upper mold assembly held movably up and down on a press side frame and provided to be opened and closed with respect to said lower mold assembly, a molding bladder expansible with respect to a center mechanism of the lower mold assembly and pressurized heating medium supplying means, characterized in that for maintaining a parallelism of the upper and lower mold assemblies, a torsion shaft for maintaining the parallelism which is movable up and down and rotatable about an axis in synchronism with the upper mold assembly is mounted at a position parallel to the press base, at a right angle to the side frame and not interfering with the upper and lower mold assemblies. In accordance with a second invention, there is further provided a tire vulcanizer in which a lower mold assembly is mounted on a press base, an upper mold assembly is held to be opened and closed with respect to said lower mold assembly on the side of a press frame, and screw shafts disposed on a mold supporting platen in a circumferentially equidistant fashion surrounding a center mechanism of an assembly and nut gears provided adjustably in height through screw nuts threadedly engaged with said screw shafts at the top of an assembly dome and mounted on said screw nuts are synchronously drived by a center gear provided at the top of the dome concentric with said center mechanism, characterized in that there is provided an idle gear meshed with the center gear coaxial with a nut gear meshed with said center gear, said idle gear being operatively connected to a driving gear on the side of a prime mover. In accordance with a third invention, there is provided a tire vulcanizer comprising a press base, a lower mold cavity and an upper mold cavity vertically movable toward said lower mold cavity, both said cavities being mounted opposedly on said press base, mechanical locking means for the upper and lower mold cavities, a center mechanism arranged at each center of the upper and lower mold cavities and mold pressing means directly acting on the lower portion of the lower mold, characterized in that the mold pressing means comprises a cylinder tube, a piston fitted therein and pressurized medium supplying means capable of supplying and discharging liquid pressure relative to both upper and lower surfaces of said piston, said cylinder tube is provided below the lower mold cavity through a mounting element, and said piston side is connected to the lower mold side. In accordance with a fourth invention, there is provided a tire vulcanizer in which plates each having a heating source are detachably mounted on opposite surfces of vertically opposedly arranged platen supports, each platen being provided with an upper mold and a lower mold to form an openable and closeable mold device for molding an outer peripheral surface of a green tire, and a center mechanism which is insertable and has a bladder for molding an inner peripheral surface of a green tire, characterized in that radially arranged arms are mounted on the outer peripheral portion of the lower platen support, said arms each being projected upwardly and corresponding to the outer peripheral surface of the lower platen in a diametral direction, tapped holes radially extend through said corresponding portion, a push bolt is threadedly engaged with said tapped hole through a lock nut so that the bolt may be fixed movably forward and backward in a direction of a bolt axis and the end of said bolt may be placed in contact with the outer peripheral surface of the lower platen, and the center mechanism is mounted while being positioned to the lower platen. In accordance with a fifth invention, there is provided a tire vulcanizer comprising a carrying-out device for an vulcanized tire provided movably into and out of a vulcanizing mold, characterized in that a plurality of radially movable and securable guide stoppers are provided at a tire support portion of said carrying-out device surrounding a tread portion of the tire.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 10 is a vertical sectional view showing essential parts as a part of a tire vulcanizer;

FIG. 2 is a vertical sectional view showing essential parts of a tire vulcanizer;

FIG. 13 is an enlarged view of a portion as indicated by arrow A in FIG. 12;

DESCRIPTION OF THE PREFERRED EMBODIMENTS

Figure 1:
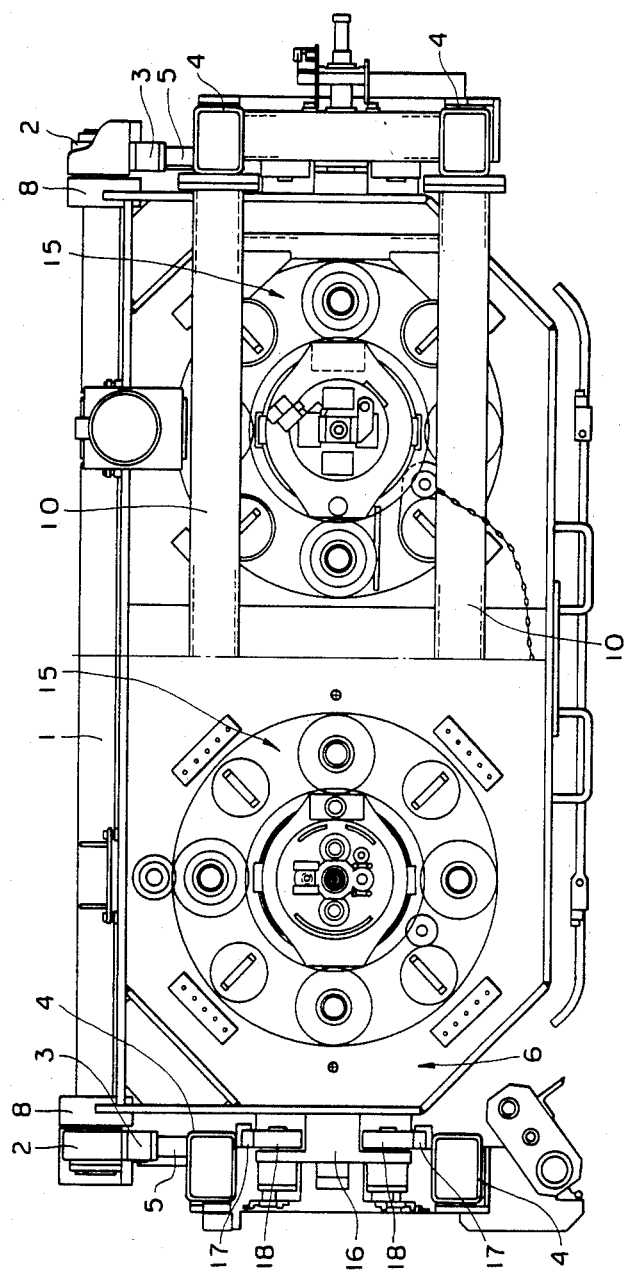
FIG. 1 is a plan view of a tire vulcanizer of a twin type using an embodiment of the device according to the present invention.

In the following discussion, a first, a second, a third, a fourth and a fifth invention will be described in detail. First, operations of these inventions will be described beginning with the first invention.

According to the technical means of the present invention, a slide 16 is integrally provided externally of a frame 6 for supporting the entire structure of an upper mold assembly 11, and a plurality of guide rollers 18, 19 are placed in contact with and supported on a guide rail 17 with the slide 16 being provided on the side of a side frame 4, said guide rollers 18, 19 being able to be moved up and down. In the rear surface of a vulcanizer provided with a tire unloader 21 opposite to the front surface of the vulcanizer provided with a tire loader 19 in FIG. 1, bearing blocks 8, 8 are provided on opposite ends of the rear surface of the frame 6, a torsion shaft 1 which is parallel to a base 9 over the bearing blocks 8, 8, horizontal and at a right angle to side frames 4, 4 is rotatably journalled and extended therethrough, pinions 2, 2 are secured to opposite ends of the shaft 1, said pinions 2, 2 being brought into engagement with racks 3, 3 mounted vertically through a support 5 externally of the side frame 4, and the torsion shaft 1 is moved at the same time of vertical operation for opening and closing the assembly 15 together with the slide 16 and the frame 6, i.e., in synchronism with the upper mold assembly 15 integral with the frame 6 and is made rotable around the axis through rolling of the pinions 2, 2 in the rack 3, 3 surfaces whereby the left and right slides 16, 16 and fluid pressure cylinders 7, 7 are placed in complete synchronism with each other by the intermediate provision of the torsion shaft 1, over the entire stroke of opening and closing and vertical movement of the upper mold assembly 15 through the slides 16 and frame 6 through the forward and backward movement of a pinion rod 7a of the fluid pressure cylinder 7, thus the intended extremely high parallelism of the movable upper mold relative to the fixed lower mold is secured. By properly setting the diameter of the torsion shaft 1, the above-described strict requirement of parallelism within 0.2 mm/m can be satisfied using the conventional slide guide construction without modification. A support portion 23 also serving as a stopper for the shaft 1 is provided at the lowest end of the rack 3 according to the lowest down position of the torsion shaft 1 corresponding to the closed position of the upper mold assembly 15 through a bracket 22 or the like.

The operation of the second invention will now be described.

Figure 4:
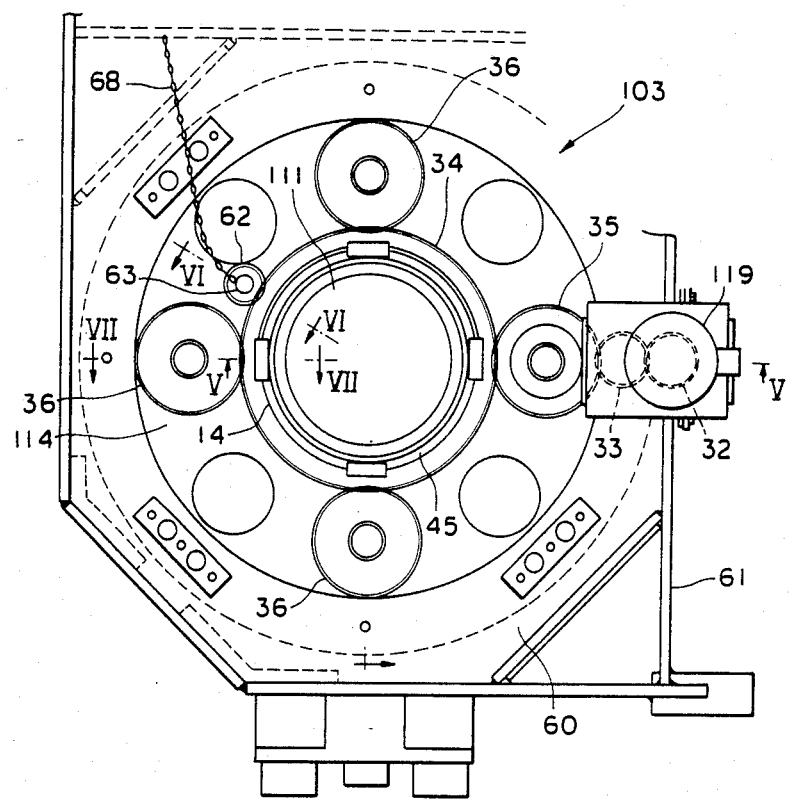
FIG. 4 is a plan view of a mold-height adjusting device according to the present invention.
Figure 5:
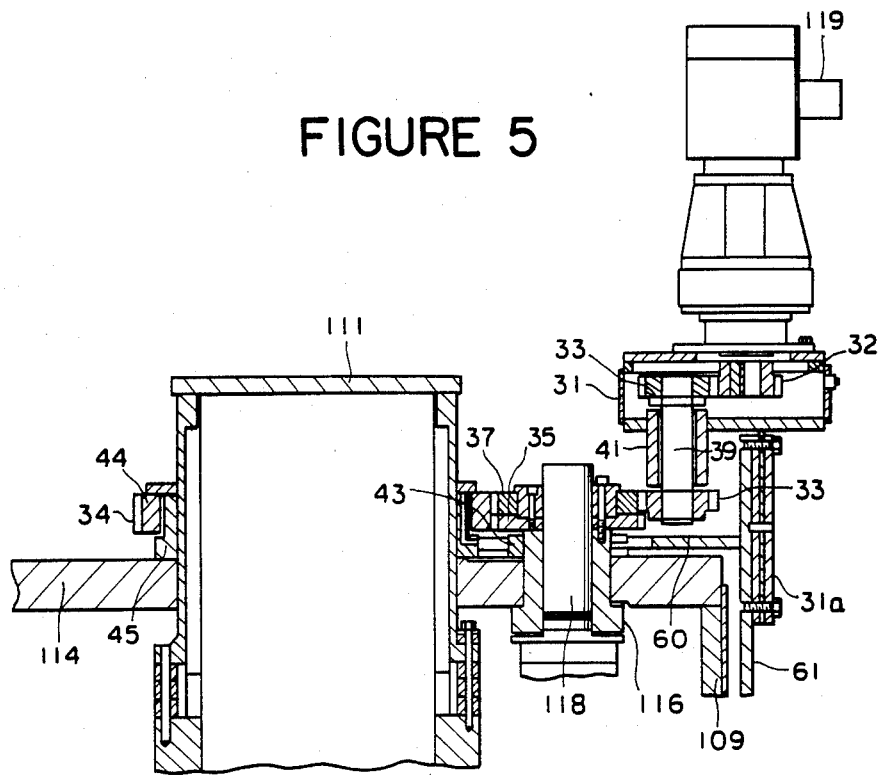
FIG. 5 is a sectional view taken along line V—V of FIG. 4.
Figure 6:
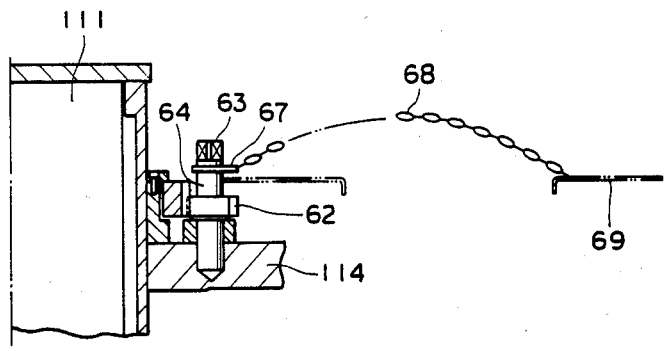
FIG. 6 is a sectional view taken on line VI—VI of FIG. 4.
Figure 7:
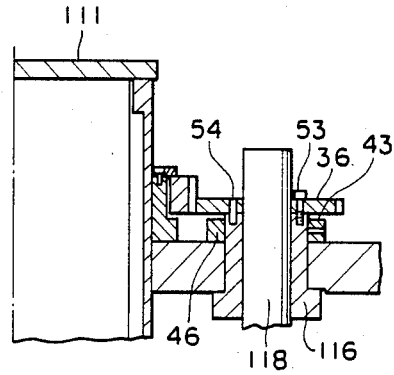
FIG. 7 is a sectional view taken on line VII—VII of FIG. 4.
Figure 9:
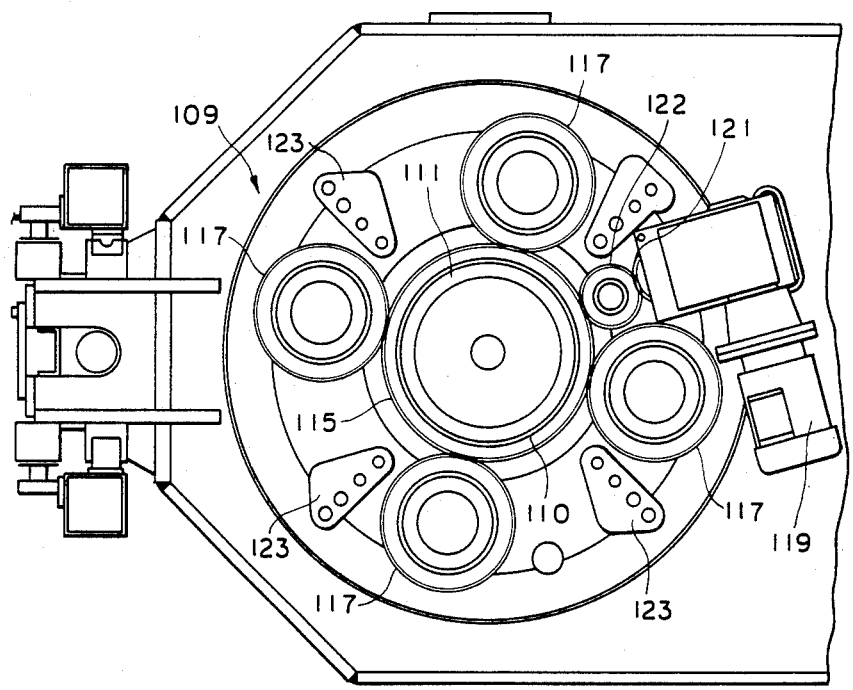
FIG. 9 is a plan view showing one example of a conventional height adjusting device.

According to the technical means of the present invention, in FIGS. 4 to 7, such is similar to the prior art in that a center mechanism 111 is slidably provided at a center position of a top 114 of an upper dome 109 in an upper dome assembly 103 and in that a plurality of screw nuts 116 are rotatably disposed at the top 114 at periperally equidistant positions surrounding the center mechanism 111 and a screw shaft 118 is threadedly inserted into each screw nut 116 for vertical movement. In the present invention, however, a center gear 34 is rotatably mounted through a bush 44 or the like on a gear support 45 disposed on the top 114 side surrounding the center mechanism, an idle gear 37 is coaxially superposed above a nut gear 35 meshed with the center gear 44 and provided on the screw nut 116 side, the idle gear 37 being likewise meshed with the center gear 37, and intermediate gears 33, 33 are used which are provided at upper and lower portions of an intermediate shaft 39 rotatably mounted through a bush 40 on a shaft support 41 provided on the bracket 31 so that the upper intermediate gear 33 is brought into engagement with a driving gear 32 of a motor 119 or a prime mover installed on a motor bracket 31 mounted on a wall 61 of a plate 60 attached to the top 114, the lower intermediate gear 33 is brought into engagement with the idle gear 37 and a nut gear 36 provided on each of other screw nuts 116 of the nut gear 35 is brought into engagement with the center gear 34 as shown in FIG. 7, whereby the following operation is brought forth. That is, in moving the upper mold 113 in the upper mold assembly 103 upward and downward for adjustment of the height, when the motor 119 starts to rotate the driving gear 32 either normally or reversely whereby the gear 32 is interlocked with the upper and lower gears 33, 33 of the intermediate shaft 39, and the center gear 34 is directly rotated by the idle gear 37. The nut gears 35, 36, 36, 36 are accurately synchronously driven through the rotation of the center gear 34 by the idle gear 37, and the screw shafts 118 are moved up and down at the same time by either normal or reverse rotation of the screw nuts 116. With this, the upper mold 113 is accurately and stably moved up and down through the upper platen 112 having the screw shafts 118 connected thereto to easily obtain adjustment of the height with accuracy and high precision. According to the aforesaid arrangement, the idle gear 37 for directly rotating the center gear 34 and the single nut gear 35 are coaxially disposed and the idle gear 37 is connected to the driving gear 32 on the prime mover side to thereby eliminate inaccuracy of the synchronous motion resulting from the driving of the center gear 34 by the nut gear and to impart complete synchronous motion to the nut gears 35, 36 and screw shafts 118. In terms of space, the idle gear 37 is accommodated within the space occupied by the single nut gear 35 to involve no requirement and difficulty to secure a space for installation of the idle gear 37 in a limited space in the top 114 of the upper dome 109, as a consequence of which in arranging the nut gears 35, 36 on the top 114, in arranging the bolt mounting portions of the molds, and in installing the motor 119, etc., a freedom in design with a sufficient space and without difficulty may be obtained. For example, as shown in FIGS. 4 and 6, the gear may well be mounted on the top 114 together with a shaft 64 provided at an engaging head 33 with a jack pinion 62 for manually rotating the center gear 34 because of a problem with the motor, a power failure and other problems.

The operation of the third invention will now be described.

When liquid pressure is supplied to the lower surface side of a piston 183 through a liquid-feed means under the conditins that an upper mold cavity 165 and a lower mold cavity 153 are connected by mechanical locking means 175, a cylinder tube 181 is entirely moved down since a lower platen 157 is mounted on a base 151 by a support shaft and the upper mold cavity 165 and the lower mold cavity 153 are entirely moved down to produce a fastening force between upper and lower molds 158 and 172.

On the other hand, at the time of absence of pressure, liquid pressure is supplied to the upper side of a piston 183 fitted in the cylinder tube 181 through liquidfeed means 185, the lower mold cavity 153 is moved up conversely to the former, and the lower mold cavity 153 comes into contact with the upper mold cavity 165 to form a clearance between a lock ring 176 as mechanical locking means 175 and upper and lower mold cavities 153, 165, making the lock ring 176 possible to rotate.

The operation of the fourth invention will now be described.

Centering adjustment of a lower platen 216 in a diametral direction to an upper piston 229 is carried out by loosening a mounting bolt 217 for the lower platen moving one push bolt 221 which corresponds to the other push bolt 221 in the diametral direction in an inner diametral direction whereas rearwardly moving the other push bolt to an outer diametral direction moves the lower platen 216.

After the accuracy of centering has been confirmed, the bolt 217 is tightened, and the push bolt 221 is locked by a lock nut 222, thus terminating the centering.

The operation of the fifth invention will now be described.

Figure 16:
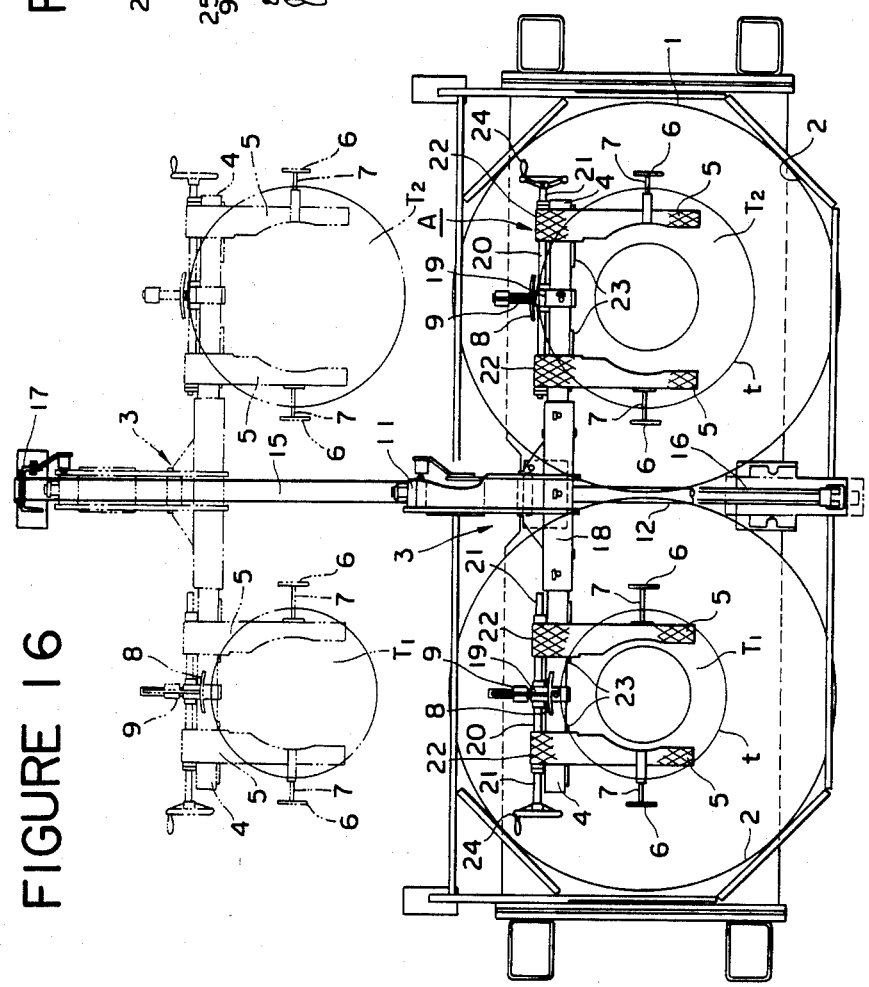
FIG. 16 is a plan view of a tire carrying-out device.
Figure 17:
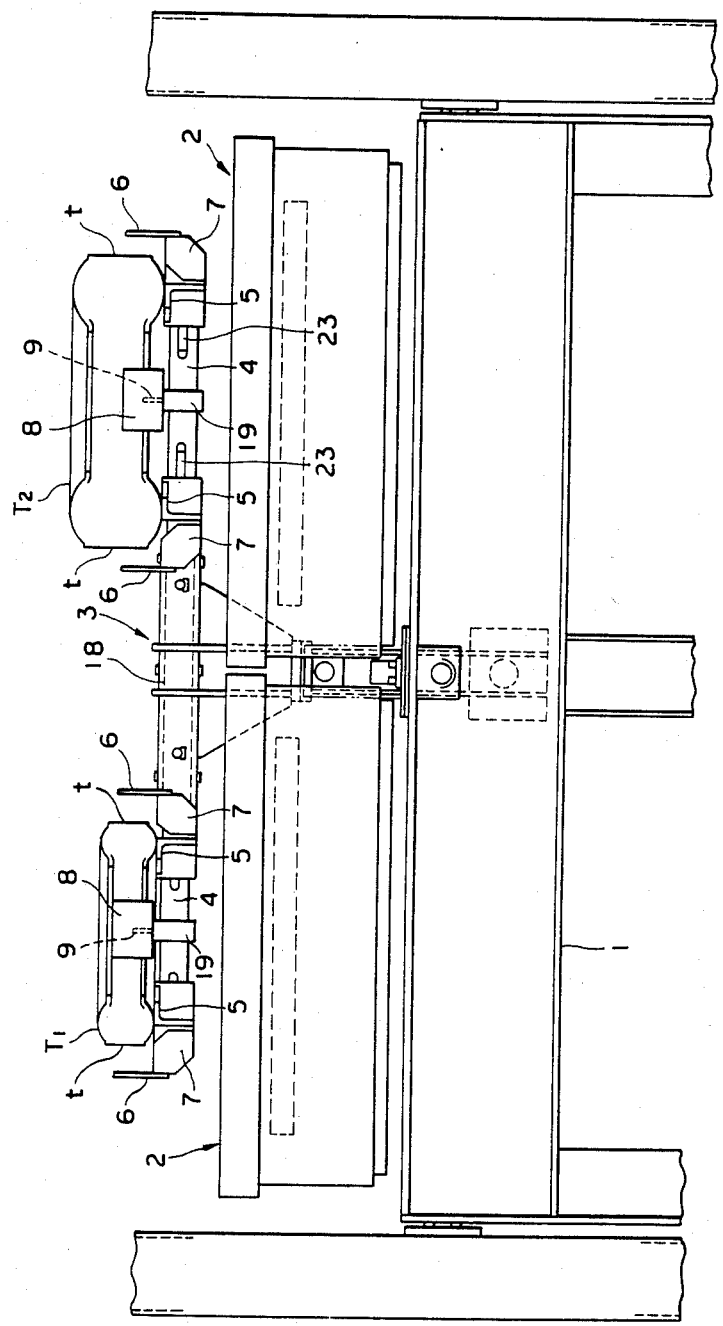
FIG. 17 is a front view of the same.

According to the technical means of the invention, as shown in FIGS. 16 to 19, a body 253 of the tire carrying out device moved into and out of the machine toward a lower mold 252 arranged on a base 251 in a known tire vulcanizer, a pair of support arms 255,255 are provided movably forward and backward in a direction opposite each other along a support body 254 branched from the body 253 to support a bottom (lower side wall portion) of a vulcanized tire T raised or pushed up from the lower mold 252 in a manner such that support arms are parallel to each other and a spacing therebetween may be varied according to the size of the diameter of the tire T. These support arms 255,255 are utilized so that guide stoppers 256, diametrally opposed to symmetrical peripheral sides (both left and right sides) of a tire tread portion t of the tire T are provided in an upright state through brackets 257, or the like externally of both the arms 255, 255 and a guide stopper 256 diametrally opposed to the peripheral side (rear surface) of the tread portion t of the tire T is provided in an upright state through a bracket 257 or the like in the central portion of said support body 254 at the intermediate position between both the guide stoppers 258, The pair of guide stoppers 256, 256 provided externally of the support arms 255,255 are variable in distance to the center of the tire so that as shown on the left side of FIG. 16, when the diameter of the vulcanized tire $T_1$ is small, both the arms 255,255 are moved at the time of access movement of the arms 255,255 toward the center corresponding therto whereas as shown on the right side of FIG. 16, when the diameter of the vulcanized tire $T_2$ is large, both the arms 255, 255 are moved at the same time as the parting movement of the arms 255, 255 from the center of the tire corresponding thereto to change the position thereof. On the other hand, the guide stopper 258 at the rear surface is likewise provided so as to be movable toward and away from the center of the tire by hands or the like since the stopper is provided on the side of the support body 254. The stoppers 256, 256 and 268 may either have straight wall or bent wall but should have a height which is lower than that of the tread portion t either to the smallest tire $T_1$ or the largest tire $T_2$ as shown in FIG. 13, that is, which does not project above the upper surface of the tire. Accordingly, in FIG. 16, during the vulcanization of the tire, the tire carring-out device body 253 is moved to the rear position as shown by the chain line, and after the vulcanization of the tire, i.e., after the upper mold has been opened as is shown, the vulcanized tire T on the lower mold 252 is pushed up in a horizontal attitude above the lower mold 252 as shown in FIGS. 16 and 17 through the removal of the bladder and upward movement of the bladder well or the like. At the same time, the device 253 is moved from the position indicated by the chain line in FIG. 16 to the position indicated by the solid line whereby the bottom of the tire T is supported on the pair of support arms 255 and 255 and the guide stoppers 256, 256, 258 are diametrally opposed externally of the tread portion t on both sides of the tire T and the tread portion t on the rear side whereby the device 253 is moved from the position indicated by the solid line to the position indicated by the chain line in FIG. 16 to thereby prevent occurrence of an accident such as disengagement of the tire T from the support arms 255, 255 during the carrying-out of the tire T. In addition, in transferring the tire from the carrying-out point at a position indicated by the chain line to the conveyor for the next step, for example, even in moving the tire T while gripping it by tire gripping means for gripping an upper bed portion of the tire T, since the guide stoppers 256,256, 258 are lower in height than the tire tread portion t, there is no possibility at all that the stoppers extend above the upper surface of the tire and the gripping motion of the tire gripping means is impaired. While in the illustrated embodiment, the guide stoppers 256,256,258 are not in direct contact being away from the tire tread portion t by a small clearance, it is to be noted that they are not always necessary to contact with each other but it will suffice to restrain the tire T within a certain range to check a further play thereof. Normally, the carrying-out device of this kind is not designed to move a long distance but a relatively short distance from the position of the mold to the outside of the vulcanizer, and movement for the long distance is effected by a separate tire gripping means while gripping the tire. Therefore, the guide stoppers are not necessary for forcible contact but can be of course placed in contact and supported. That is, according to the construction of the guide stopper of the present invention, in the vulcanized tire T, the side wall portions which are thin in wall-thickness and small in rigidity as compared with those the tread portion are pressed and held to safely restrain the tire by the plurality of the guide stoppers 256, 256, 258 arranged externally of the tread portion t without producing a deformation or scratches as encountered in prior art. Moreover, in transferring the tire by the separate tire gripping means, the guide stoppers need not be withdrawn or the like, and no problem in gripping motion or the mechanism occurs. At least two guide stoppers 256, 256 on both sides are moved together utilizing the spacing varying construction of the support arms 255,255 in the carryingout device to provide for easy adjustment, and therefore, a separate adjusting means is not required and the construction may be simplified.

The preferred embodiments of the first, second, third, fourth and fifth inventions will now be described.

First, the embodiment of the first invention is described.

Figure 2:
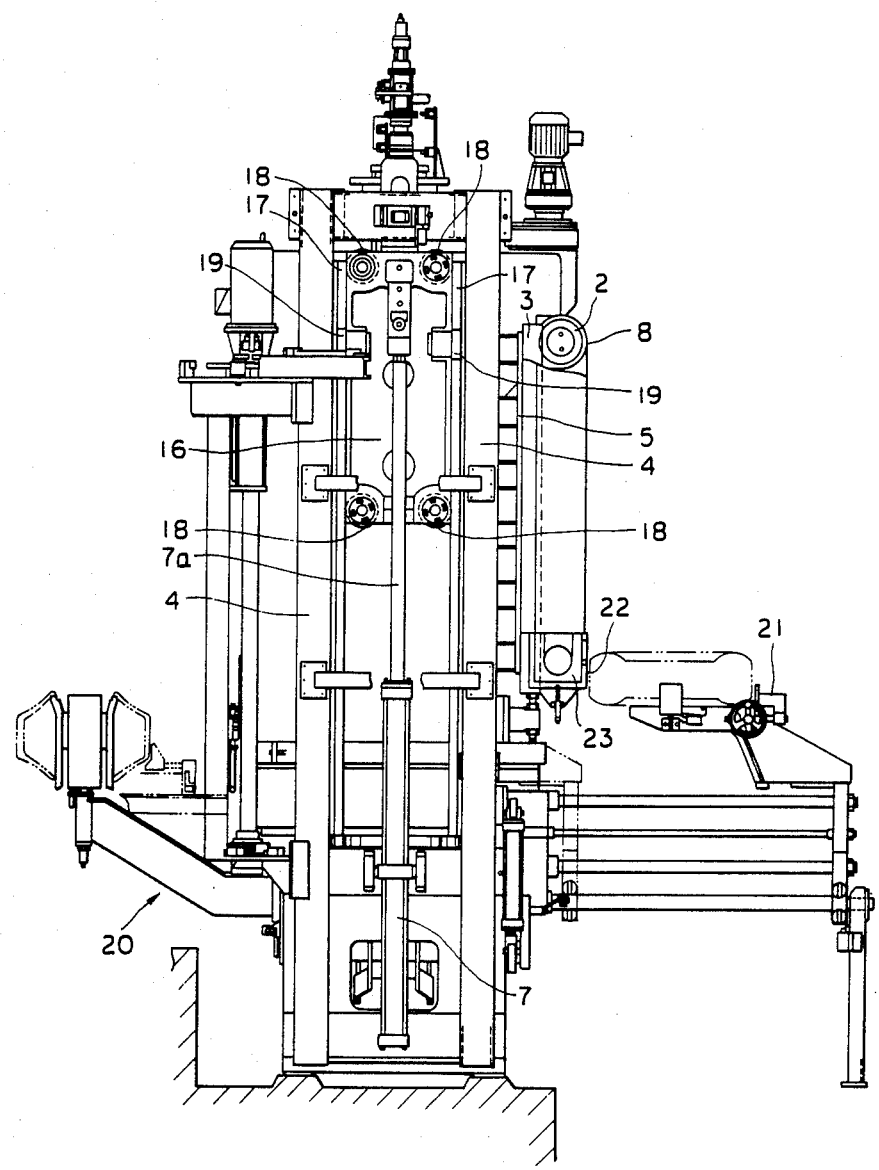
FIG. 2 is a side view of the tire mechanism of FIG. 1.
Figure 3:
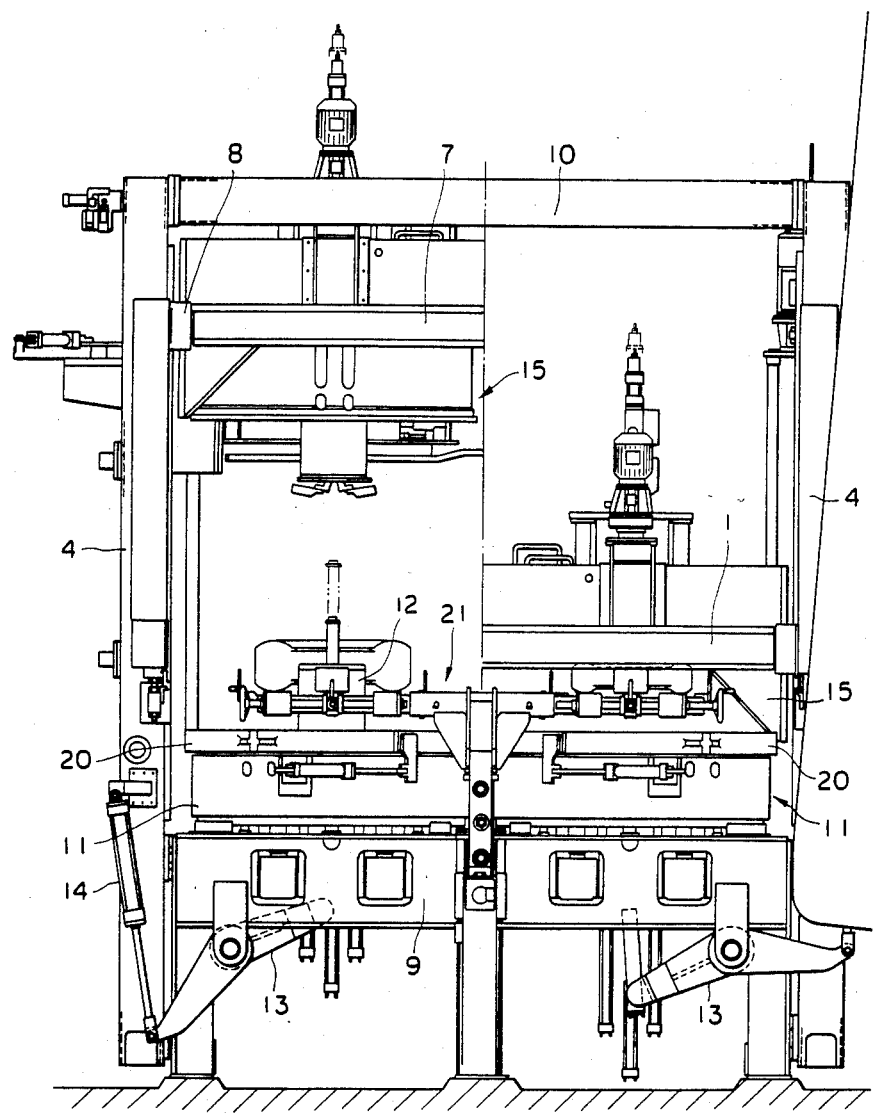
FIG. 3 is a rear view thereof.

Reference is made to FIGS. 1, 2 and 3. If the tire vulcanizer is of the type in which the upper mold assembly 15 is moved up and down with respect to the lower mold assembly 11 through the frame 6 and the slide 16 so that it may be opened and closed, the present invention may be applied to such type. For the internal assembly construction of the upper and lower mold assemblies 15, 11, various constructions of a conventional tire vulcanizer may be freely employed, which are therefore not described in detail. For the upper and lower molds, the type in which a mold is divided into two sections from a central position of a tire tread portion or the type in which the lower mold comprises only a single tire side wall and the upper mold is divided into two sections, one side wall portion and a second tread portion may be employed. For carrying in a green tire and carrying out a vulcanized tire, devices and mechanisms other than the illustrated tire loader 19 and the tire unloader 21 may be used. Although the twin type is shown, a single or a multi-type may also be used. In the case of the illustrated twin type, the frame 6 is extended over the two upper mold assemblies 15, 15 or connected by a connecting beam. The frame 6 can be similar to one heretofore known as a top slide, including one in which the slide 16 is connected to the upper dome itself.

The torsion shaft 1 need not be formed of a material having a high rigidity and may have a suitable sectional shape. However, in the diameter of the shaft 1 is necessary to properly set according to the scale of the vulcanizer. The integrated construction of the slide 16 and frame 6 of the torsion shaft 1 and the upper mold assembly 15 can be other than those illustrated. The construction other than the rack 3 and pinion 2 will have the same effect if moved synchronously and may be rotated.

The present invention is excellent in solving a problem of providing strict parallelism required by a conventional tire vulcanizer of the type in which upper mpold is vertically opened and closed. It has been confirmed as the result of practice that in the case the parallelism of upper and lower molds (upper and lower platens) is within 0.2 mm/m, the parallelism with 0.05 mm required in the left and right slide guide portions is obtained by addition of the torsion shaft 1 having a general rigidity.

More specifically, imbalance and unevenness resulting from respective independent operation of the left and right slide guide portions are eliminated by the presence of the torsion shaft 1 for rigidly connecting both the portions. As the result, in the twin type as illustrated, even if only one side press cavity is operated to effect vulcanization, the required high parallelism is obtained. Moreover, according to the technical means of the present invention, the conventional slide guide construction (it is of course a characteristic of the present invention that guide members such as guide rails and a plurality of rollers restrained thereby are provided) is utilized without modification, and an increase in rigidity of the press frame and an increase in size of the slide are not required. Thus, the demand of high parallelism can be satisfied by anticipation of the construction with a relatively small rigidity, as a consequence of which the press precision of the vulcanizer may be enhanced. Accordingly, the present invention is realistic and greatly advantageous.

Next, the embodiment of the second invention will be described.

Figure 8:
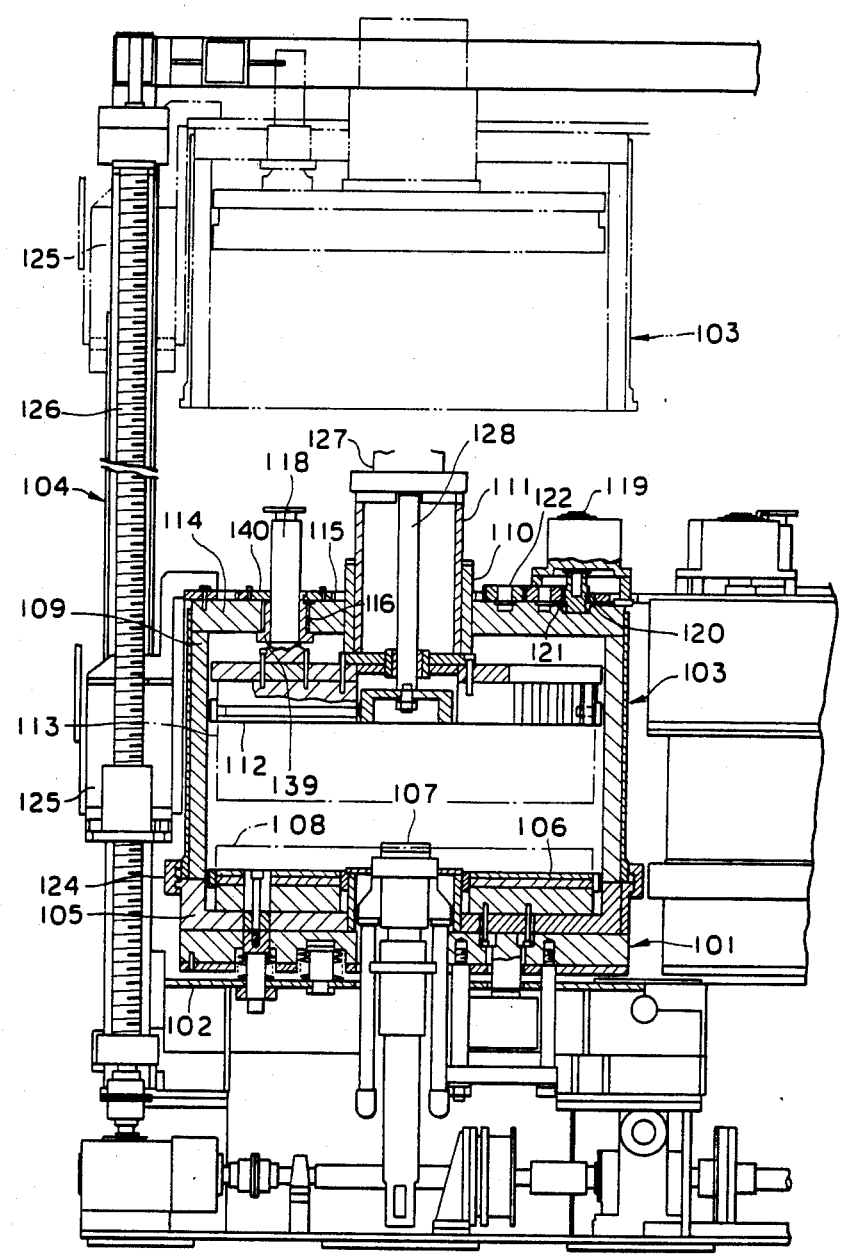
FIG. 8 is a longitudinal sectional front view showing one example of a tire press.

Reference is now made to FIGS. 4 to 7. In the illustrated embodiment, in slidably providing the center mechanism 111 in the center of the top 114 of the upper dome 109, an inserting hole 40 is formed in the center position of the tip 114 and a gear support 45 is erected on the upper surface of the top at the position of the hole 40. In this case, however, a bracket 110 shown in FIG. 8 may be used. In providing the nut gear 5 and the idle gear 7 on the screw nut 116 in a coaxial and superposed manner, in the embodiment shown in FIG. 5, the nut gear 35 is arranged through a thrust ring 43 on a support 46 provided on the upper end of the screw nut 116, a support 38 is coaxially mounted on the gear 35 by a bolt 51, the idle gear 37 is mounted on the support 38, and the support 38, nut gear 35 and screw nut 116 are integrally fastened by means of separate bolts 52, the gear 35 and support 38 being loosely fitted on the screw shaft 118. Of course, this mounting construction is a mere example and constructions other than that shown may be used. A motor bracket 31 is in the form of approximately box including a cover plate 47, and a mounting portion 31a projected on the lower surface of the bracket 31 is fastened and secured to the wall 31 side by means of a bolt or the like. In a jack pinion 62 shown in FIG. 6, reference numeral 68 designates a chain provided through a clip 67, and numeral 69 designates a cover held on the chain 68. FIG. 7 shows a nut gear other than the nut gear 35 shown in FIG. 8 in which case, the gear 35 is secured through a thrust ring 43 to the screw nut 116 by means of a parallel pin 54 and a fastening bolt 53. In the tire press shown in FIG. 4, reference numeral 124 designates a known clamp ring for disengageably clamping upper and lower domes 109, 105 when the upper and lower mold assemblies 101, 103 are closed, and numeral 125 designates a lift connected to the upper dome assembly 103. A ball screw nut (not shown) threadedly engaging the screw shaft 126 provided on the side frame 104 is located on the lift 125 to effect vertical movement.

A fluid pressure cylinder 127 is installed on the top of the center mechanism 115, and a piston rod 128 thereof extends through the center mechanism 111 and is connected to the upper mod 113, which are well known.

The present invention is excellent in eliminating the disadvantages encountered in prior art which includes the type in which the center gear is directly driven by the pinion gear and the type in which it is driven by use of the nut gear. More specifically, in the pinion type, the center gear is connected through the prime gear on the side of the prime mover and the intermediate gear and is provided at a position separately from the nut gear. On the other hand, in the present invention, the idler gear 37 is coaxially and superposedly provided concentric with the single nut gear 35 to thereby completely eliminate a space for installation of the gear Disadvantages in terms of space greatly restricted for various mountings in the upper dome top 114 are eliminated. A large diameter of a driving pinion may be employed. Positive driving may be obtained and a freedom of design may be secured. For the driving system making use of the nut gear, completely synchornous operation may be secured to thereby attain the adjustment of the height of the upper mold with high accuracy. Thus, the invention is greatly advantageous to solve problems encountered in the device for adjusting the height of the upper mold.

The embodiment of the third invention will now be described.

In FIG. 10, reference numeral 151 designates a press base, which is fixed on the horizontal surface through legs 152.

A lower mold cavity 153 or a lower dome comprises a bottom plate 154 and a body 155 stood upright in the outer peripery of the bottom plate. A lower platen 157 is placed within the cavity 153 through an heat insulating material and a lower mold 158 for molding an outer circumferential surface of a green tire is detachably secured onto the lower platen 157.

A support shaft 159 is inserted into a support bracket 160 secured to the press base 151 and fastened by a nut 161. This support shaft 159 is inserted into the bottom plate 154 of the lower mold cavity 153. A bolt 163 is mounted through a heat insulating material 162 and the lower platen 157 is supported on the base 151 side.

A plate spring 164 is placed over the support shaft 159 to damp clamping. The aforementioned support shaft 159 is provided equiangularly on the circumference in the center of the press.

An upper mold cavity 165 comprises a top 166 mounted on the top slide not shown and a body 176 connected to the top 166, which cavity corresponds to the lower mold cavity 163 in a relation above and below on the concentric circle and is provided movably in a vertical direction by a cylinder, a ball screw shaft, a threaded shaft and the like are not being shown.

A mold-height adjusting mechanism 168 is provided on the top 16 of the upper mold cavity 165, an upper platen 171 is mounted on a center post 169 of the mechanism 168 and an upper mold 172 is provided on the platen 171. Accordingly, when the upper mold 172 and the lower mold 158 are openable and closeable and are closed, a cavity 173 for molding the outer circumferential shape of a green tire is formed.

Reference numeral 174 denotes a center mechanism which comprises the center of the press, the details of which are omitted. The center mechanism has a bladder which can be inserted into the cavity 173 and expanded, and the shape of the inner circumferential surface of the tire may be molded by the internal pressure thereof.

Figure 11:
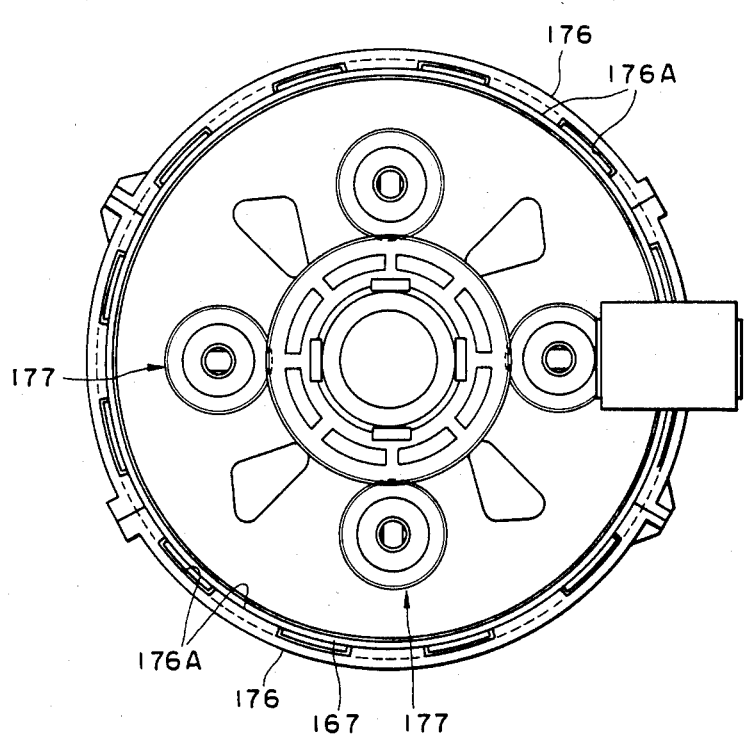
FIG. 11 is a plan view showing essential parts of FIG. 10.

Reference numeral 175 designates mechanical locking means, which comprises a lock ring 176 peripherally and alternately formed with concave-convex portions 176A as shown in FIG. 11, and an open edge 155A of the body 155 in the lower mold cavity 153 and an open edge 167A of the body 167 in the upper mold cavity 165 are registered, in which state the lock ring 176 provided between these open edges is rotated whereby both the edges may be locked or released.

The rotation of the lock ring 176 is effected by the cylinder or the like (not shown).

Reference numeral 177 deisgnates mold pressing means, four of which are equidistantly, at intervals of 90° in the illustrated embodiment, provided on one and the same circumference in the press center as shown.

More specifically, a mounting member 180 composed of four tie rods 178 and end plates 179 are provided on the undersurface of the bottom plate 154 in the lower mold cavity 153, a cylinder tube 181 surrounded by the tie rods 178 is mounted on the end plates 179 by means of bolts, a piston 183 is fitted into the cylinder tube 181, and pressurized liquid-feed means 184, 185 for feeding oil pressure to both upper and lower surfaces of the piston 183 are provided on the tube 181.

A push rod 186 is fixedly mounted on the lower surface of the heat insulator 156, the axis of the push rod 186 is brought into registration with that of a piston rod 187 connected to the piston 183, and a mounting bolt 188 inserted into the lower platen 157 extends through the push rod 186 and is screwed into the piston rod 187.

Accordingly, the upper mold cavity 165 is moved down by the mold opening and closing mechanism (not shown) to register the upper mold 172 with the lower mold 158 to thereby form the cavity 173 for molding the outer circumferential surface of the green tire, and the open edges of the upper mold cavity 165 and lower mold cavity 158 are clamped by the lock ring 176.

The bladder of the center mechanism 174 is inserted into the cavity 173 and the heating medium such as steam is fed into the bladder, and the heating source for the lower platen 157 and the upper platen 171 are made to vulcanize and mold the green tire within the cavity 173.

In this case, the upper and lower molds 158, 172 need to generate a fastening force with a force overcoming the internal pressure, which is however effected as previously mentioned by exerting the oil pressure on the lower side of the piston 183 from the liquid-feed means 185 in the mold pressing means 177. The lock ring 26 may be turned as previously mentioned by exerting oil pressure on the upper surface of the piston 183 from the liquid-feed means 185.

According to the present invention, in the upper and lower mold fastening means in the tire vulcanizer, the mold pressing means comprises a double-action cylinder whereby the up and down operation of the press may be carried out positively and the stop position thereof at the totally closed point of the press may be made constant. Accordingly, a flat spring need not be used as in prior art, and not only may the reliability be enhanced but the operation can be made quickly as compared with the return of the flat spring since the lower mold cavity may be moved up by liquid pressure.

The embodiment of the fourth invention will now be described.

In the drawings, a base 201 is mounted on the horizontal surface through legs 202.

Reference numeral 203 designates a pair of left and right side guides, and a top slide 205 is provided movably up and down through the expansion of left and right cylinders 204. A lower dome 206 comprises a circular bottom plate 207 and a body 208 thereabout. The dome is guided by connection shafts 209 radially erected on the base 201 and may be moved up and down and also moved up and down by a fastening cylinder mechanism 210.

The fastening cylinder mechanism 10 is radially arranged, and as will be apparent from FIG. 13, the fastening cylinder mechanism 210 and the connection shafts 209 are arranged peripherally and alternately. A support disc 211 is placed on a bottom plate 207 of the lower dome 206, and a cylindrical body 212 is mounted on the upper surface in the outer periphery of the support disc 211, the body 212 being inserted into a body 208 in the dome. The support disc 211 and the body 212 have a substantially heat insulating function.

A lower platen support 213 is connected to the connection shafts 209 by bolts 214 on the support disc 211 and also connected to the piston 210A side of the fastening cylinder mechanism 210.

Figure 14:
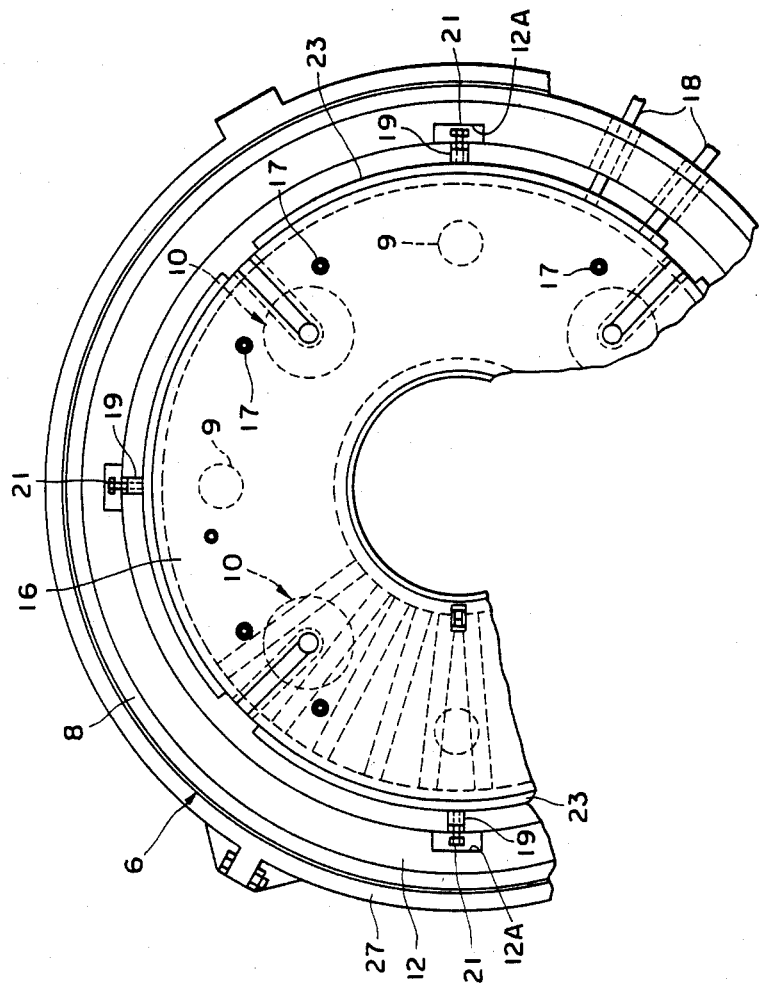
FIG. 14 is a plan view with a part thereof omitted.
Figure 15:
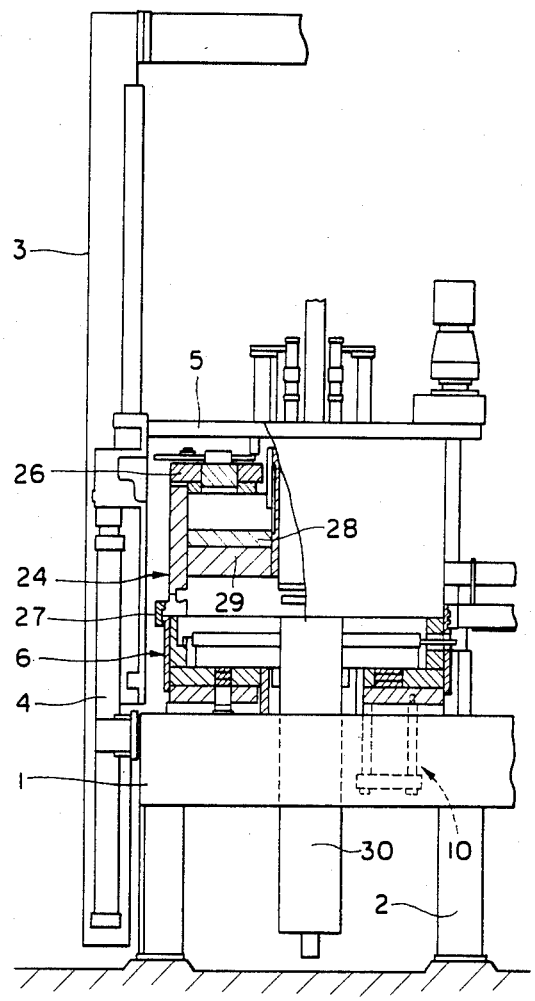
FIG. 15 is a vertical view with a part thereof omitted showing the entire construction of the tire vulcanizer.

A lower platen 216 is placed on the lower platen support 213 and may be detachably secured by bolts 217 shown in FIGS. 12 and 14, and further a known lower mold though (not shown) is detachably fixed on the lower platen 216.

The interior of the lower platen 216 is formed into a cavity 216A capable of introducing a heating source such as steam therein, and steam or the like may be fed to or discharged from the cavity 216A through a pipe 218 from outward in a diametral direction.

As shown in FIGS. 12 and 14, four radially arranged arms 219 are mounted at intervals of 90° in the illustrated embodiment in the outer peripheral portion of the lower platen support 213, and these arms 219 extend upwardly and correspond to the outer peripheral surface of the lower platen 216 in a diametral outer direction. Further, radial tapped holes 220 extend through the corresponding portions of the arms 219, and a push bolt 221 is screwed into each of the tapped holes 220 through a lock nut 222 so that the push bolt may be moved forward and backward in a direction of a bolt axis.

The push bolt 221 has a head 21A which is operated by a tool or the like, and a vertical notch 212A is formed in the body 212 for interference of the head 212A and insertion of the tool. An end of the push bolt 221 is brought into abutment with the outer circumferential surface of the lower platen and a bolt receiver 223 in the form of a circle as viewed in plan is secured to the outer circumferential surface of the lower platen 216.

An upper dome 224 comprises a cylindrical body 225 and a top 226, which is mounted on a top slide 205 as shown in FIG. 14. The upper dome 224 and the aforementioned lower dome 206 are on the concentric circle, and the registered surfaces of the bodies 208, 225 may be fastened or released by the lock ring 227 shown in FIG. 12.

An upper platen support 228 is mounted on the top 226 of the upper dome 224, an upper platen 229 having a heating source is detachably mounted on the upper platen support, and an upper mold (not shown) is detachably mounted on the lower surface of the upper platen 229.

In this embodiment, the lower platen 216 and the upper platen 229 are arranged in a relation so as to be above and below, and the upper and lower molds are opened and closed on the opposed surfaces thereof to constitute a mold device for molding an outer circumferential surface of a green tire. This mold device is encircled by the upper and lower domes 206, 224. When oil pressure is exerted on the cylinder mechanism 210 under the state where the lock ring 227 is fastened, the mold device may be applied with a closing force overcoming pressure during vulcanization.

A center mechanism 230 is positioned in a diametral direction by a guide tube 231 which moves up and down shown in FIG. 12, and has a bladder detachably provided within the mold device. The guide tube 231 is fixedly mounted on the inside diameter portion of the lower platen 216, and the center mechanism 230 having a bladder for molding the inner peripheral shape of a green tire is positioned to and mounted on the lower platen.

As is known, the bladder may be expanded and contracted in the cavity of the mold device by supplying and discharging the heating medium such as steam.

According to the present invention, the lower platen 216 mounted on the lower platen support 213 may be moved forward and backward in a diametral inner and outer direction by the push bolt 221 to perform centering with respect to the upper platen 229, and thus, even if a deviation occurs in centering between the upper platen 229 and the lower platen 216 due to the trial operation in the passage of time, this can be adjusted and registered. Furthermore, it is possible to maintain the accuracy of the mold device so as to maintain the accuracy of vulcanization and molding of the tire.

In addition, since the outer peripheral surface of the lower platen 216 is pressed by the push bolt 221 from the diametral outer direction, it is to be always pressed with constant torque, thus reducing the possibility of a deviation in centering despite the presence or absence of heating.

Moreover, freedom in design of various guide portions in the vulcanizer may be considerably increased. That is, even if the guide portions are worn out, a clearance on one side is decreased and thereafter the lower platen 216 may be moved in a diametral direction by the push bolt 221 to adjust concentricity.

Furthermore, since the adjustment of the lower platen may be done while adjusting to an adjusting allowance of the center mechanism 230, it is possible to easily effect centering and adjustment.

Finally, the embodiment of the fifth invention will be described.

Figure 18:
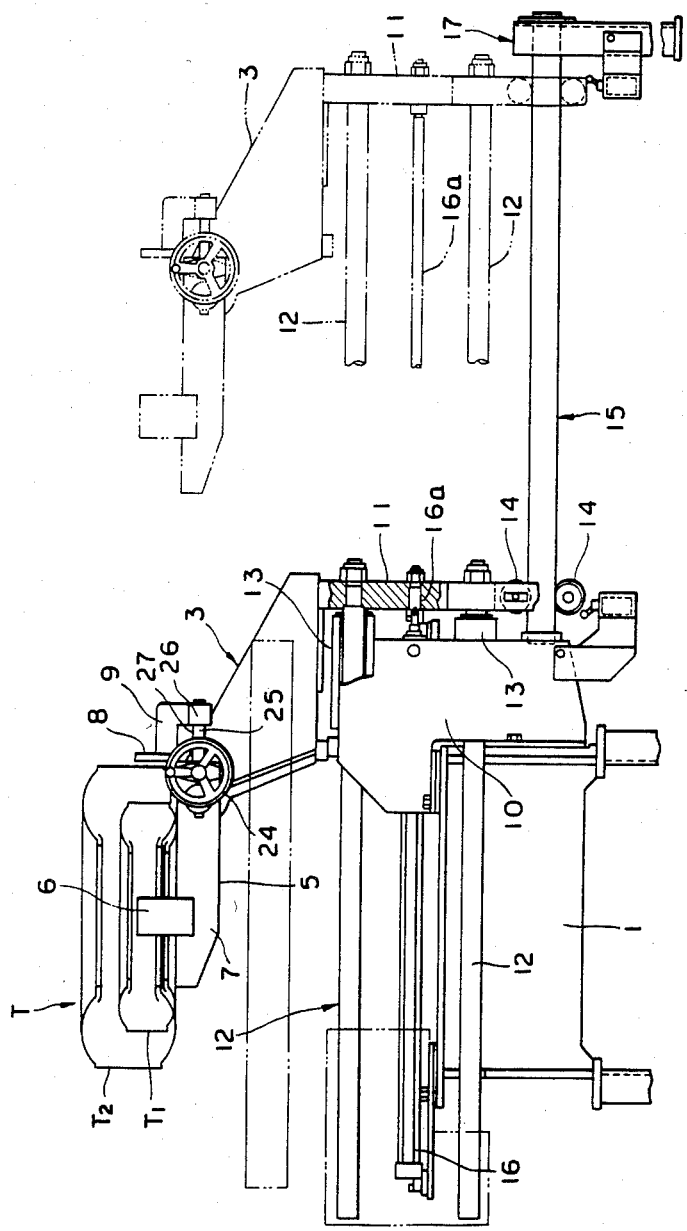
FIG. 18 is a side view of the same.

Reference is made to FIGS. 16 to 19. For the tire carrying-out device, either conventional forward and backward moving in-and-out type or turning moving in-and-out type can be employed, and in this embodiment, the former type is shown. A tire carrying-out device body 253 is slidably placed on a holder 260 installed by utilization of a base 251, a slider is integrally provided on the lower end at the rear of the body 253 as shown in FIG. 18, a guide bar 262 mounted on the slider 261 is slidably supported on a guide 263 provided on the holder 260, a guide roller 264 provided on the lower end of the slider 261 is brought into engaement with a guide bar 265 provided on the holder 260 in a rolling fashion, and a piston rod 266a of a driving cylinder 266 provided on the base 251 is connected to the slider 261 whereby the device body is reciprocated in a straight fashion in a horizontal attitude, through the forward and backward movement of the piston rod 266a of the cylinder 266 and through the guide bar 265 of the slider 261, the guide 263 and guide roller 264 and the guide bar 262, for forward and backward movement from the outside of the vulcanizer toward the lower mold 252. Reference numeral 267 designates a bracket for supporting the other end of the guide bar 265. In the embodiment, there is shown, as one example, the twin type including two sets of vulcanizing and molding molds in which two lower molds 252, 252 are juxaposed as shown in FIG. 16 within the body of the vulcanizer comprising a frame of the base 251. Therefore, the device body 253 is disposed therebetween but this can be also applied to the single type vulcanizer which merely includes one set of molds.

Figure 19:
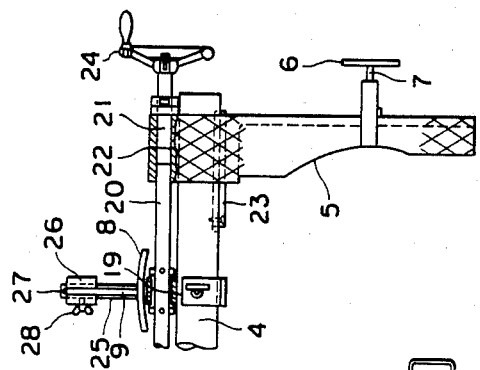
FIG. 19 is a partly cutaway plan view showing the detailed construction of a portion A of FIG. 16.

The aforementioned support bodies 254, 254 are connected to left and right of a T-shaped beam 268 mounted on the front end of the device body 253, and a pair of support arms 255, 255 are provided in contact with and away from the support bodies 254, 254. Since both the arms 255, 255 have the same construction, the support arms 255, 255 in one support body 254 will be described. As shown in FIGS. 6 and 19, a rotatable shaft 270 parallel to the support body 254 is held on bearings 269 provided in the central portion of the support body 254 so that it may be rotated normally and reversely by a hand wheel 270, oppositely oriented screw portions 271, 271 are formed on opposite ends of the shaft 270, nuts 272, 272 provided at the rear end of the support arms 255, 255, and the support arms 255, 255 are nonrotatably but slidably supported along the support body 254 through keys 273, 273. With this, the pair of support arms 255, 255 are moved toward and away from the center of the tire T through the normal and reverse rotation of the rotatable shaft 270 caused by the hand wheel 274 and through the engagement between the screw 271 and nut 272, whereby always positively and stably supporting the tires $T_1$ and $T_2$ having different sizes. In the embodiment, the support arms 255, 255 are formed into plates in the form of L-shaped section, the upper surface supporting the tire T is formed into a coarse surface or a rugged surface to prevent a skid of the tire T, and guide stoppers 256 on both sides are uprightly secured externally of the support arms 255, 255 through brackets 257 projectingly provided on the side of the L-shaped plates. While in the embodiment, the stopper 256 is in the form of a straight wall, it is to be noted that it can be a suitably curved wall or a combtooth plate. The guide stopper 256 positioned between the guide stoppers 256, 256 and diametrally opposed to the peripheral side at the rear of the tire T is designed so that as shown in FIGS. 18 and 19, the bearing 19 provided in the center of the aforesaid support body 254 is utilized to project a guide shaft 275 at the rear of the bearing 269, a slide sleeve 276 provided on the lower end of the bracket 259 is held movably forward and backward on the shaft 275 through the engagement thereof with a key 277 and adjustably fixed by means of a stop belt 278, and the guide stopper 258 in the form of a curved wall is mounted on the front end of the bracket 259, there being capable of correspondingly adjusting the position relative to the guide stoppers 258, 258 on both sides which can be adjusted in position while moving together with the support arms 255, 255. This adjustment may be made mannually but other mechanical means may be used to automatically adjust the slide.

The above-described construction is a mere example. The tire carrying-out device 253 can be of the type in which the device is moved in and out of the upper portion in the center of the mold by the turning motion, instead of the straight forward and backward type. Also, the straight forward and backward type may employ a forward and backward mechanism other than that shown. Also with respect to the mechanism for varying the spacing between the pair of support arms 255, 255 according to the size of the tire diameter, a mechanism other than the type including the rotatable shaft 20 provided with the shown oppositely oriented screws and the nut 272 may be used while modifying the design. Moreover, in the embodiment, the guide stoppers 256, 256, 258 are a mere example. The number of such stoppers may be increased over the entire periphery of the tread portion t of the vulcanized tire T, the length and width of the stopper may be freely selected except the height, and a material used therefor may also be freely selected. Since the restraint relative to the tire T and other operations illustrated in the embodiment are similar to those as previously mentioned in the description of the operation, they will not be further described.

The present invention is excellent in overcoming the problems inherent in the conventional tire carrying-out device, i.e., that the side wall surface of the vulcanized tire is restrained to impede the free movement thereof, thus complicating the construction as required, that the side wall surface is liable to be deformed or scratched, and that when the tire is moved by the carrying-out device outside the vulcanizer, at which point the tire is gripped by a separate gripping means, the gripping of the tire is impaired by said means. The guide stoppers, 256, 256, 258 which restrain the tread surface of the vulcanized tire are arranged variably in position according to the tire size to eliminate possible deformation of a tire shape and surface damages thereof. Also in this construction, stoppers lower in height than the tread surface are merely erected encircling the support members for the tire bottom in the conventional carrying-out device, thus extemely simplifying the construction. Furthermore, since the stopper does not at all interfere with both upper and lower surfaces of the tire placed horizontally, gripping of the tire by other tire gripping means and the moving function are not at all impaired.

Obviously, numerous modifications and variations of the present invention are possible in light of the above teachings. It is therefore to be understood that within the scope of the appended claims, the invention may be practiced othewise than as specifically described herein.

What is claimed as new and desired to be secured by Letters Patent of the United States is:

1. A tire vulcanizer comprising: a lower mold assembly secured to a press base, an upper mold assembly held movably up and down on a press side frame and such as to be openable and closable with respect to said lower mold assembly,
   a molding bladder expansible with respect to center machanism of the lower mold assembly;
   pressurized heating medium supplying means; and
   a torsion shaft which is connected with one of the mold assemblies in such a manner as to maintain the upper and lower mold assemblies parallel and which is movable up and down and rotatable about an axis in synchronism with the upper mold assembly and which is mounted at a position parallel to the press base, at a right angle to the side frame so as to not interfere with the upper and lower mold assemblies.

* * * * *